United States Patent
Garty et al.

(10) Patent No.: US 11,188,405 B1
(45) Date of Patent: Nov. 30, 2021

(54) SIMILAR ALERT IDENTIFICATION BASED ON APPLICATION FINGERPRINTS

(71) Applicant: ServiceNow, Inc., Santa Clara, CA (US)

(72) Inventors: Asaf Garty, Sdei Hemed (IL); Daniel Badyan, Tel Aviv (IL); Robert Bitterfeld, Petah Tikva (IL); Yair Leibkowiz, Kiryat Malachi (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/002,647

(22) Filed: Aug. 25, 2020

(51) Int. Cl.
*G06F 11/30* (2006.01)
*G06F 11/07* (2006.01)

(52) U.S. Cl.
CPC ...... *G06F 11/0772* (2013.01); *G06F 11/0751* (2013.01)

(58) Field of Classification Search
CPC .......................... G06F 11/0772; G06F 11/0781
USPC ...................................................... 714/57, 26
See application file for complete search history.

(56) References Cited

U.S. PATENT DOCUMENTS

| | | | |
|---|---|---|---|
| 9,639,414 B1 | 5/2017 | Wu | |
| 10,176,032 B2 | 1/2019 | Horrell | |
| 2002/0173997 A1 | 11/2002 | Menard | |
| 2009/0265587 A1 | 10/2009 | Yamaguchi | |
| 2010/0023604 A1 | 1/2010 | Verma | |
| 2012/0036397 A1 | 2/2012 | Balani | |
| 2012/0210434 A1 | 8/2012 | Curtis | |
| 2018/0101907 A1* | 4/2018 | Yamashita | H04L 67/22 |
| 2018/0351783 A1* | 12/2018 | Patrich | H04L 41/0636 |
| 2019/0222503 A1* | 7/2019 | Bell | H04L 43/16 |
| 2020/0201744 A1 | 6/2020 | Ho | |
| 2020/0314118 A1* | 10/2020 | Levin | H04L 63/1466 |
| 2020/0327005 A1* | 10/2020 | Singh | G06F 11/3006 |
| 2020/0327008 A1* | 10/2020 | Singh | G06F 11/0793 |
| 2021/0081539 A1* | 3/2021 | Karin | G06F 11/3065 |

* cited by examiner

*Primary Examiner* — Chae M Ko
(74) *Attorney, Agent, or Firm* — Van Pelt, Yi & James LLP (57) ABSTRACT

A new alert associated with a computer information technology item is received. The new alert is evaluated, including by determining application fingerprints of applications executing on a server associated with the new alert. Matching previous alerts similar to the new alert are identified, including by comparing the application fingerprints of the server associated with the new alert with corresponding application fingerprints of servers associated with previous alerts. The matching previous alerts are sorted based at least in part on the comparison of the application fingerprints.

20 Claims, 6 Drawing Sheets

SIMILAR ALERT IDENTIFICATION BASED ON APPLICATION FINGERPRINTS

BACKGROUND OF THE INVENTION

Information technology (IT) is the use of computers to store, retrieve, transmit, and manipulate data. IT systems include information systems, communications systems, and computer systems (e.g., hardware, software, and peripheral equipment) operated by users. IT systems oftentimes support business operations. An IT administrator, also known as a system administrator, is a specialist responsible for the maintenance, configuration, and reliable operation of IT systems, including servers, network equipment, and other IT infrastructure. IT administrators respond to IT problem alerts (e.g., regarding failure of computers, networks, software, etc.). IT administrators are tasked with resolving these IT problem alerts by remediating the underlying IT issues. Oftentimes, an IT administrator may not know what remediation to apply to resolve an IT problem alert. Thus, techniques directed toward assisting IT administrators with IT problem alert remediation would be beneficial.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A new alert associated with a computer information technology item is received. The new alert is evaluated, including by determining application fingerprints of applications executing on a server associated with the new alert. Matching previous alerts similar to the new alert are identified, including by comparing the application fingerprints of the server associated with the new alert with corresponding application fingerprints of servers associated with previous alerts. The matching previous alerts are sorted based at least in part on the comparison of the application fingerprints. A technological and practical benefit of the techniques disclosed herein is that an IT administrator can better locate prior IT alerts that are relevant (e.g., similar) to an alert of interest. Locating similar prior IT alerts is valuable because remediations that were successful for the similar prior IT alerts can be retrieved and attempted for the alert of interest and are more likely to be successful for the alert of interest than remediations associated with non-similar prior IT alerts. An advantage of the techniques disclosed herein is that they correspond to locating similar prior alerts based on configuration item information (e.g., server similarity and application fingerprints, as described in further detail herein). Prior approaches that rely only on IT alert description text similarity to identify similar prior alerts are not as effective because IT alert description text is often generic and non-specific. In many scenarios, an IT administrator is presented with too many alerts to handle when similar prior alerts are located based on IT alert description text similarity alone. Thus, the techniques disclosed herein improve IT systems technology and improve the functioning of IT systems by providing for improved identification of alert remediation options based on better identification of similar alerts.

In various scenarios, IT problem alerts associated with different underlying applications and/or technologies require significantly differing remediations. Relying on alert event description text similarity is oftentimes not helpful in these scenarios. The following example is illustrative. For example, a first type of database server (e.g., corresponding to a first software/hardware vendor) may cause an alert whose description includes "corrupted database table index". For the first type of database server, a first type of remediation tailored to the first type of database server would be used (or must be used) to resolve the "corrupted database index table" problem. A second type of database server (e.g., corresponding to a second software/hardware vendor), may also cause an alert whose description includes "corrupted database table index". However, the second type of database server may require (and oftentimes does require) a different type of remediation than for the first type of database server even though the associated alert description is the same or similar. In general, each type of server that produces a "corrupted database table index" alert may require its own specific remediation.

Thus, the above is an example of different configuration items (e.g., servers, applications executing on servers, etc.)

requiring different remediation actions. As used herein, a configuration item (CI) refers to a service component, infrastructure element, or other item that needs to be managed to ensure delivery of IT services. Examples of CI types include: hardware/devices, software/applications, communications/networks, and storage components. It is oftentimes difficult to identify relevant prior remediations based on similar alert description text because the prior remediations could be associated with different CIs that are not applicable to a current alert of interest. For the "corrupted database table index" example given above, there may be hundreds or thousands of matching alerts based on alert description text similarity because a corrupted database table index is a common alert. The techniques disclosed herein can be utilized to filter out irrelevant alerts (involving non-similar CIs) to potentially narrow down hundreds or thousands of alerts to a manageable number. In some embodiments, alert description text similarity and CI similarity are utilized in conjunction to identify prior alerts relevant to a current alert of interest. Stated alternatively, an alert description text screening step can be utilized and if more than a specified number of matching alerts are surfaced, further screening based on CI similarity can be performed.

In various embodiments, an alert of interest (a new alert) is evaluated by determining application fingerprints associated with the alert of interest. In various embodiments, determining application fingerprints includes identifying which applications are executing on a server associated with the alert of interest based on the various software processes executing on the server associated with the alert of interest. In some embodiments, applications are identified by clustering the software processes (e.g., by utilizing a machine learning algorithm). Clustering of software processes is described in further detail herein. In various embodiments, matching previous alerts similar to the alert of interest (the new alert) are identified by comparing the application fingerprints of the server associated with the alert of interest with corresponding application fingerprints of servers associated with previous alerts. In various embodiments, a server similarity algorithm (as described in further detail herein) is utilized to determine similarities between different servers according to their application fingerprints. In various embodiments, a server similarity score is generated for each server compared to the server associated with the alert of interest.

In various embodiments, alerts are linked to servers based on error reporting by the servers. In some embodiments, a monitoring system (e.g., part of event management software, which is also referred to herein as event monitoring software) that includes software agents on each server collects and transmits information associated with IT problems. These IT problems cause IT alerts to be generated. In various embodiments, the monitoring system tracks CIs, such as servers, applications executing on servers, services, and server hardware (e.g., CPUs, storage disks, etc.). In various embodiments, an alert is generated due to a problem (e.g., an exception in a database). In some embodiments, alerts include an alert identification number, alert description text, and a severity score. In various embodiments, a user (e.g., an IT administrator) is able to view alerts via a user interface (e.g., on an alert dashboard) and is able to prioritize alerts (e.g., give priority to remediating critical alerts). An example system whose functionality includes managing IT alerts is described below.

Figure 1:
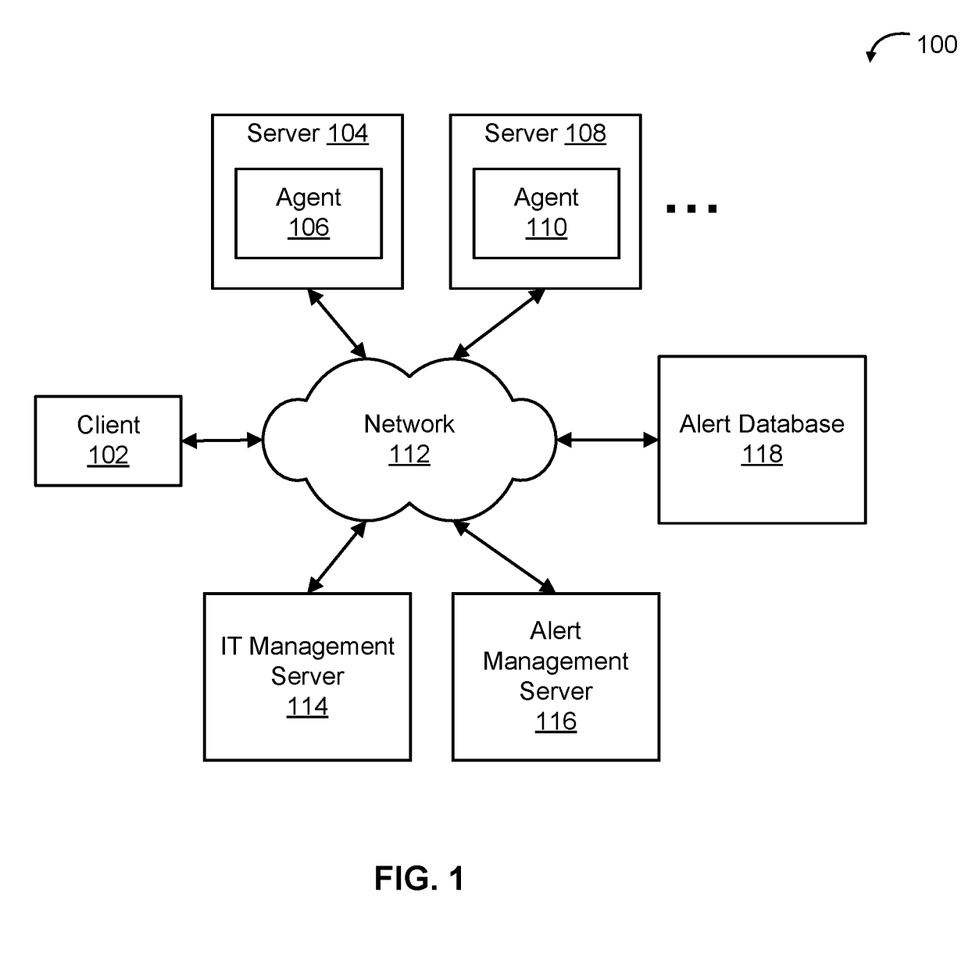
FIG. 1 is a block diagram illustrating an embodiment of a system for identifying similar IT alerts and managing IT alerts.

FIG. 1 is a block diagram illustrating an embodiment of a system for identifying similar IT alerts and managing IT alerts. In the example shown, system 100 includes client 102, servers 104 and 108, network 112, IT management server 114, alert management server 116, and alert database 118. In some embodiments, client 102 is a programmed computer system. In various embodiments, client 102 is a computer or other hardware device that a user, such as an IT administrator, utilizes to interface with one or more servers associated with managing and remediating alerts. Examples of client hardware devices include desktop computers, laptop computers, tablets, smartphones, and other devices. In various embodiments, client 102 includes a software user interface, such as a graphical user interface, through which the user views alerts associated with IT items (e.g., problems and issues associated with the items), views a list of potential remediations (also referred to herein as remediation actions) for each alert, and selects remediations for alerts. The software user interface may be a web portal, internal network portal, other portal, browser, or mobile application that allows users to manage and remediate alerts.

In some embodiments, client 102 is a mobile device that includes a user interface that allows the user to view alerts, view potential remediations, and select remediations to initiate. In various embodiments, the mobile device is a computing device that is small enough to hold and operate in a person's hand. In various embodiments, the mobile device includes a flat screen display (e.g., a liquid crystal display or a light-emitting diode display), an input interface (e.g., with touchscreen digital buttons), and wireless connectivity hardware (e.g., Wi-Fi, Bluetooth, cellular, etc.). Examples of mobile devices include smartphones, smartwatches, and tablets.

In the example illustrated, client 102 is communicatively connected to network 112. IT alerts are managed and remediated by interfacing with IT management server 114 via network 112. Examples of network 112 include one or more of the following: a direct or indirect physical communication connection, mobile communication network, Internet, intranet, Local Area Network, Wide Area Network, Storage Area Network, and any other form of connecting two or more systems, components, or storage devices together. In the example illustrated, various servers (e.g., servers 104 and 108, IT management server 114, and alert management server 116) are communicatively connected via network 112. In various embodiments, each server is a computer or other hardware component that provides a specified functionality for client 102 or another computer or device.

In the example illustrated, servers 104 and 108 are examples of IT assets from which IT problems may arise. These IT problems cause IT alerts to be generated. For example, software applications or software processes running on servers 104 and 108 may be unresponsive, thus triggering alerts. As used herein, a software process (or process for short) refers to an instance of a computer program that is being executed by electronic circuitry of a computer, such as a central processing unit. The computer program associated with the process is a collection of instructions while the process is the execution of those instructions. Several processes may be associated with the same computer program (also referred to as an application or software application). There may be tens or hundreds of processes associated with each application, and there may be hundreds of applications running on a sever. Thus, many IT alerts can result from software failures. Example potential remediation actions for unresponsive software (e.g., an unresponsive process) include stopping the process (e.g., pausing the process and continuing it later), ending the process (e.g., terminating the application to which the process belongs), killing the process (e.g., forcing closure without cleaning up temporary files associated with the process), and restarting the device/server on which the process is executing. As another example, hardware components of servers 104 and 108 may also become unresponsive or otherwise fail to perform properly, thus triggering IT alerts. Examples of hardware IT problems include power supply problems, hard drive failures, overheating, connection cable failures, and network connectivity problems. Example remediation actions include updating hardware configurations, restarting devices/servers, and dispatching a technician to physically attend to the hardware (e.g., by replacing the hardware). The example shown is illustrative and not restrictive. Additional servers that include IT assets may also exist and be communicatively connected via network 112.

In the example illustrated, servers 104 and 108 include agents 106 and 110, respectively. Agents 106 and 110 are software applications (e.g., event monitoring software) that collect, analyze, and report specified event occurrences on servers 104 and 108, respectively. In some embodiments, each agent detects IT performance problems, collects associated information, and transmits the information to alert management server 116. In various embodiments, alert management server 116 utilizes the information transmitted by an agent to create an alert associated with an IT problem. In various embodiments, the alert includes various fields that are useful for uniquely identifying the alert and managing the alert. Examples of alert fields include a number field (e.g., storing a unique identification number), a source field (e.g., storing the event monitoring software reporting the problem), a node field (e.g., storing a domain name, IP address, MAC address, etc. associated with the IT problem), an alert text description (also referred to as alert description text) field (e.g., storing a text description of the IT problem), a configuration item field (e.g., storing a JavaScript Object Notation (JSON) string that identifies the service component, infrastructure element, or other IT item—hardware, software, network, storage, or otherwise—that is managed to ensure delivery of IT services), a severity field (e.g., storing a qualitative rating of the severity of the alert, such as critical, major, minor, etc.), a state field (e.g., storing a status, such as open, closed, etc.), an acknowledged field (e.g., storing an indication as to whether a user has acknowledged the alert), an initial event generation time field (e.g., storing the time when an agent detected the underlying event/IT problem that triggered the alert), an alert creation field (e.g., storing the time when the alert was created), an alert remediation action field (e.g., storing attempted alert remediation actions and the times the actions were taken), and an alert closure field (e.g., storing the time when the alert was closed).

In some embodiments, alert management server 116 is accessed by IT management server 114. In some embodiments, IT management server 114 provides various IT management services and tools that are controlled by client 102 via network 112 to manage IT items (e.g., IT problems/issues associated with servers 104 and 108). Examples of IT management tasks include creating and updating an inventory of IT assets, defining and managing user access priorities associated with various IT assets, configuring and running IT infrastructure components, and managing IT alerts. Thus, in addition to accessing alert management server 116, IT management server 114 may also access various other IT related services hosted on different servers. In various embodiments, IT management server 114 provides an alert remediation interface to a user through client 102. In various embodiments, IT management server 114 coordinates with alert management server 116 and alert database 118 to initiate performance of alert remediation actions selected by the user of client 102 or alert remediation actions that are selected automatically. In some embodiments, IT management server 114 receives an alert of interest from alert management server 116, evaluates the alert of interest, determines matching previous alerts similar to the alert of interest, and sorts the matching previous alerts.

In some embodiments, IT management server 114 presents one or more remediation actions associated with an alert that a user (e.g., an IT administrator) selects. For example, the user may be presented with matching previous alerts similar to an alert of interest, and the user may select one of the presented alerts to view remediation actions associated with that alert. By viewing these remediation actions, the user can decide to attempt one of these remediation actions for the alert of interest.

IT management server 114 determines similar alerts by comparing a given alert of interest against alerts stored in alert database 118. Alert database 118 is an example of an alert data store (a storage location for alerts). In various embodiments, alert database 118 is a structured set of data held in one or more computers and/or storage devices. Examples of storage devices include hard disk drives and solid-state drives. In some embodiments, alert database 118 stores specified alert information corresponding to IT problems associated with IT assets on servers communicatively connected to network 112 (e.g., servers 104 and 108). The specified alert information includes remediation actions performed for alerts. In some embodiments, alert database 118 receives information to store from alert management server 116. For example, in some embodiments, upon closure of an alert, alert management server 116 transfers specified data fields associated with the alert to alert database 118 for storage (e.g., remediations attempted). The stored information can be used for future reference and alert management purposes. In the example illustrated, alert management server 116 and alert database 118 are shown as separate components that are communicatively connected. It is also possible for alert database 118 to be a part of alert management server 116 and for alert management server 116 to manage transfer of alert database data to IT management server 114. Alternatively, it is possible for IT management server 114, alert management server 116, and alert database 118 to be integrated as subcomponents into a unified IT instance.

In some embodiments, the techniques disclosed herein are utilized in a data center IT environment. In a data center environment (and in other IT environments), multiple alerts can be reported by multiple monitoring systems in a short period of time. Because alerts are reported rapidly, it can be difficult to analyze alerts quickly in real time to determine appropriate remediation actions. Prior approaches can be cumbersome due to the need to search through numerous prior alerts that are not relevant in order to determine remediation actions to attempt for a current alert of interest, which can be infeasibly time consuming for IT administrators. The techniques disclosed herein are advantageous because they can be utilized to identify a handful of most relevant prior alerts, thereby saving time for IT administrators.

In the example shown, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. For example, additional clients and servers may exist. The number of components and the connections shown in FIG. 1 are merely illustrative. Components not shown in FIG. 1 may also exist.

Figure 2:
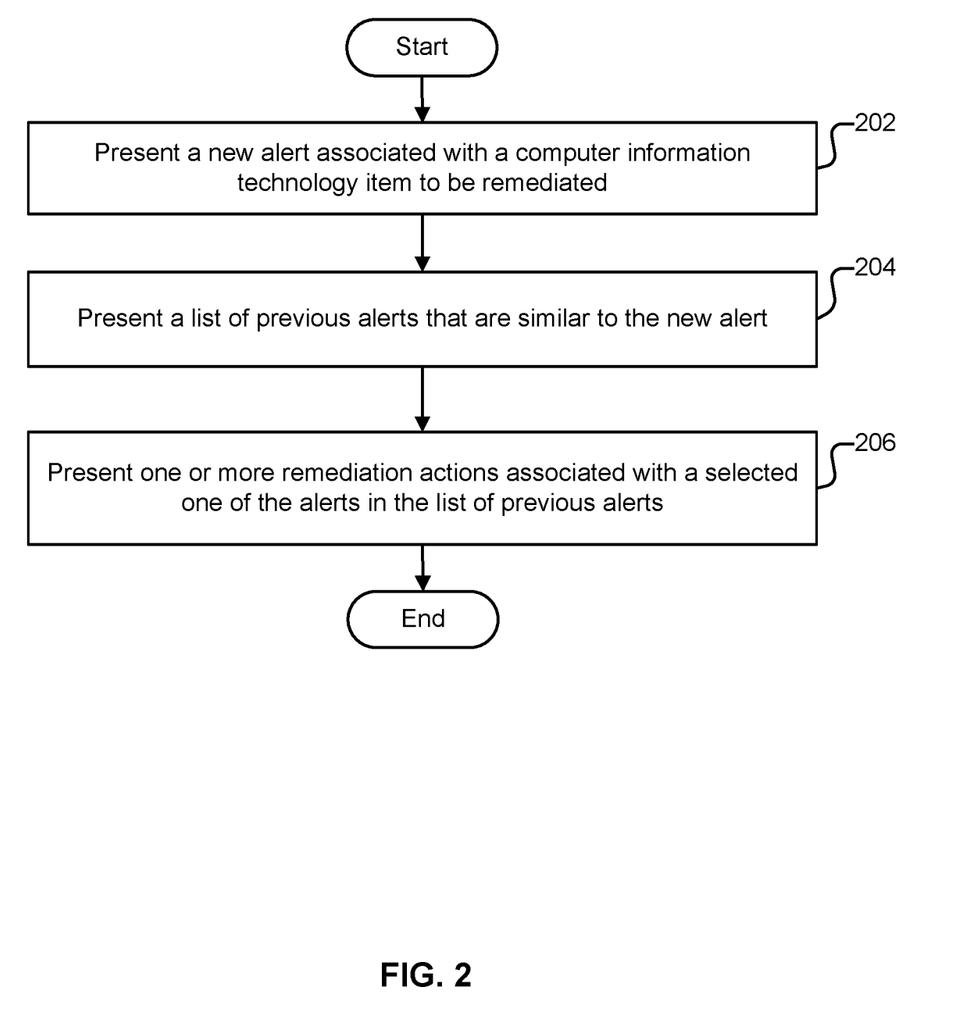
FIG. 2 is a flow chart illustrating an embodiment of a process for utilizing similar IT alerts.

FIG. 2 is a flow chart illustrating an embodiment of a process for utilizing similar IT alerts. In some embodiments, the process of FIG. 2 is performed by IT management server 114 of FIG. 1.

At 202, a new alert associated with a computer information technology item to be remediated is presented. In various embodiments, the computer information technology item is associated with an underlying computer information technology problem to be remediated. In various embodiments, the computer information technology item involves an underlying configuration item that needs to be remediated (e.g., reconfigured or restored) to a functioning state. In various embodiments, the new alert is presented to a user (e.g., and IT administrator). For example, the new alert may be presented to the user via network 112 of FIG. 1 to client 102 of FIG. 1. In various embodiments, the user views the new alert via a user interface (e.g., an alerts dashboard) of client 102 of FIG. 1. In some embodiments, the new alert is created by alert management server 116 based on information collected by a monitoring agent (e.g., agent 106 or 110 of FIG. 1). In various embodiments, the user can respond to the presented new alert by selecting an option (via the user interface) to view previous alerts that are similar to the new alert. In some embodiments, IT management server 114 receives the user's request to view previous alerts that are similar to the new alert.

At 204, a list of previous alerts that are similar to the new alert are presented. In some embodiments, the list of previous alerts is presented by IT management server 114 of FIG. 1 to client 102 of FIG. 1. In some embodiments, previous alerts are ranked and/or scored according to relevance to the new alert. Previous alerts that meet a specified rank/score threshold can be presented. Alerts that do not meet the specified rank/score threshold may be accessed through a separate collapsed list that is not presented as prominently to the user. In many scenarios, the purpose of viewing previous similar alerts is to identify remediation actions that successfully resolved those previous similar alerts. The principle is that relevant remediations are associated with similar alerts (e.g., similar based on application fingerprints as described in further detail herein). In various embodiments, remediation information associated with alerts can be viewed because they are saved and stored (e.g., in alert database 118 of FIG. 1). In various embodiments, the user can select an alert from the list of previous alerts and select an option (via the user interface) to view remediation actions associated with the selected alert.

At 206, one or more remediation actions associated with a selected one of the alerts in the list of previous alerts is presented. In some embodiments, the remediation actions are presented by IT management server 114 of FIG. 1 to client 102 of FIG. 1. For example, an IT administrator may be presented with two or three remediation actions. In some embodiments, likelihood of success associated with the remediation actions are also presented. For example, "restart server (80%)", "kill process (10%)", and so forth may be presented as remediation action options with associated success percentage rates. In some embodiments, the percentage rates are based on remediation success rates of the corresponding remediation actions across all the alerts in the list of previous alerts that are similar to the new alert. The user is able to select a remediation action and initiate performance of the selected remediation action. Various types of remediation actions exist. Example remediation actions include stopping a software process, ending a software process, killing a software process, restarting a device/server, updating a hardware configuration, and dispatching a technician to perform an inspection.

Alternatively, instead of soliciting a user to manually select a remediation action, it is also possible for IT management server 114 of FIG. 1 to operate in an automatic remediation mode in which a remediation action is automatically selected to be performed. All alerts in the list of previous alerts that are similar to the new alert may be examined to determine remediation action options and their likelihoods of success. Selecting the remediation action can be based on various factors, including likelihood of success of the remediation and cost of unsuccessful remediation. In some embodiments, IT management server 114 of FIG. 1 supplies alert management server 116 of FIG. 1 with automated alert management rules. Automated alert process workflows can be initiated based on the alert management rules. Alerts matching a first set of specified conditions can be assigned to automated remediation in which a remediation action is automatically selected and alerts matching other specified conditions can be assigned to manual remediation in which an IT administrator must select a remediation. In some embodiments, alert management rules include attempting a backup remediation action if a first remediation action fails and/or attempting remediation actions successively in a specified order until remediation is successful.

Figure 3:
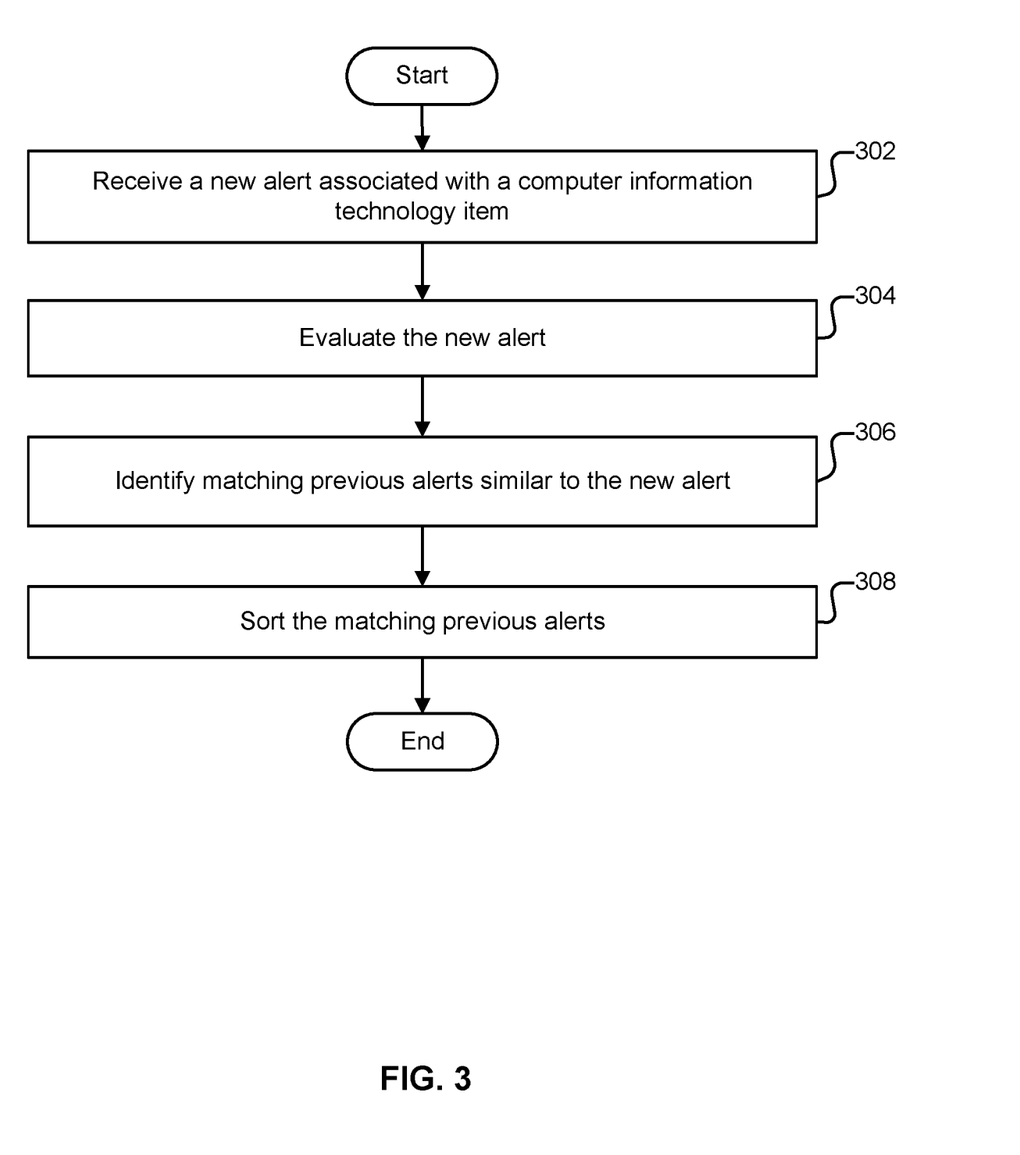
FIG. 3 is a flow chart illustrating an embodiment of a process for identifying similar IT alerts.

FIG. 3 is a flow chart illustrating an embodiment of a process for identifying similar IT alerts. In some embodiments, the process of FIG. 3 is performed by IT management server 114 of FIG. 1. In some embodiments, at least a portion of the process of FIG. 3 is performed in 204 of FIG. 2.

At 302, a new alert associated with a computer information technology item is received. Examples of computer information technology items (e.g., problems/issues) include unresponsive software (e.g., an unresponsive application, process, etc.), missing/inconsistent computer files, other software issues (e.g., a runtime error, failure to execute, failure to terminate, etc.), and hardware issues (e.g., power supply problems, storage device failures, overheating, connection cable failures, and network connectivity problems). In various embodiments, the new alert is associated with a server (e.g., servers 104 or 108 of FIG. 1). In some embodiments, the new alert is generated by alert management server 116 of FIG. 1 based on data collected by software agents (e.g., agents 106 or 110 of FIG. 1) and received by IT management server 114 of FIG. 1.

At 304, the new alert is evaluated. In various embodiments, evaluating the new alert includes determining application fingerprints of applications executing on a server associated with the new alert. In various embodiments, each application executing on the server associated with the new alert is associated with its own application fingerprint. A collection of application fingerprints is associated with a collection of applications. Application fingerprints indicate which applications are executing, which can be determined by clustering software processes according to one or more parameters associated with the software processes (e.g., as described in further detail in FIG. 4). In some embodiments, application fingerprints are generated for a server (e.g., servers 104 and 108 of FIG. 1) from which an IT problem originates when a corresponding alert is created (e.g., for alerts created by alert management server 116 of FIG. 1). Thus, application fingerprints can be linked to IT alerts, allowing for IT alerts to be compared by comparing corresponding application fingerprints. In some embodiments, application fingerprints are stored with their corresponding IT alerts in alert database 118 of FIG. 1.

Applications executing on a server are examples of CIs. Thus, application fingerprints can be regarded as CI fingerprints and server similarity can be regarded as CI similarity. It is also possible to generate fingerprints that incorporate other CIs. For example, hardware components installed on the server where the applications are being executed can be factored into fingerprint generation. In some embodiments, a constellation of CIs (e.g., applications, processes, hardware devices, etc.) associated with an IT problem is utilized as a CI fingerprint and associated with an IT problem and its corresponding IT alert.

At 306, matching previous alerts similar to the new alert are identified. In various embodiments, identifying the matching previous alerts includes comparing the application fingerprints of the server associated with the new alert with corresponding application fingerprints of servers associated with previous alerts. In some embodiments, application fingerprints to be compared are retrieved from alert database 118 of FIG. 1. In various embodiments, a server similarity algorithm is utilized to determine similarities between different servers according to their application fingerprints. In various embodiments, a comparison metric is computed to determine a numerical value corresponding to how similar a previous alert is to the new alert. A server similarity score can then be generated for each server that is compared to the server associated with the alert of interest.

In some embodiments, a screening step is performed before or in addition to identifying matching previous alerts based on application fingerprints. For example, previous alerts that are similar to the new alert can be identified based on alert text description similarity. In various embodiments, alert text description is a field stored with each IT alert. In some embodiments, alert text similarity is determined based at least in part on keyword matching (e.g., alert text descriptions with similar keywords indicate alert similarity). Natural language processing (NLU) may also be utilized to determine alert text similarity. For example, in some embodiments, a trained machine learning model is utilized to parse utterances associated with alert text to extract intents. An utterance refers to a natural language example of an intent, e.g., a text string from an alert text description, and an intent refers to a meaning, e.g., "the process is unresponsive", "there is no network connection", or another human understandable description of an IT problem. Examples of machine learning models that can be utilized to perform NLU tasks include word vector representations, window-based neural networks, recurrent neural networks, long-short-term-memory models, recursive neural networks, and convolutional neural networks. Prior to utilizing the machine learning model, the machine learning model is trained on a collection of example utterances (e.g., example alert descriptions) and their associated meanings. The training occurs before a new utterance (new alert text) is processed using the machine learning model in inference mode. Requiring more than one type of similarity (e.g., requiring both application fingerprints similarity and alert text similarity) can result in improved specificity with respect to identifying previous alerts whose associated remediations are likely to be applicable to the new alert.

At 308, the matching previous alerts are sorted. In various embodiments, the matching previous alerts are sorted based at least in part on the comparison of the application fingerprints. For example, the matching previous alerts may be sorted according to a similarity score that is derived from a metric associated with each matching previous alert. In some embodiments, the score and/or metric is associated with a distance (e.g., a vector distance) and/or fingerprint overlap between sets of application fingerprints. In various embodiments, sorted matching previous alerts are presented to a user (e.g., via a user interface of client 102 of FIG. 1).

Figure 4:
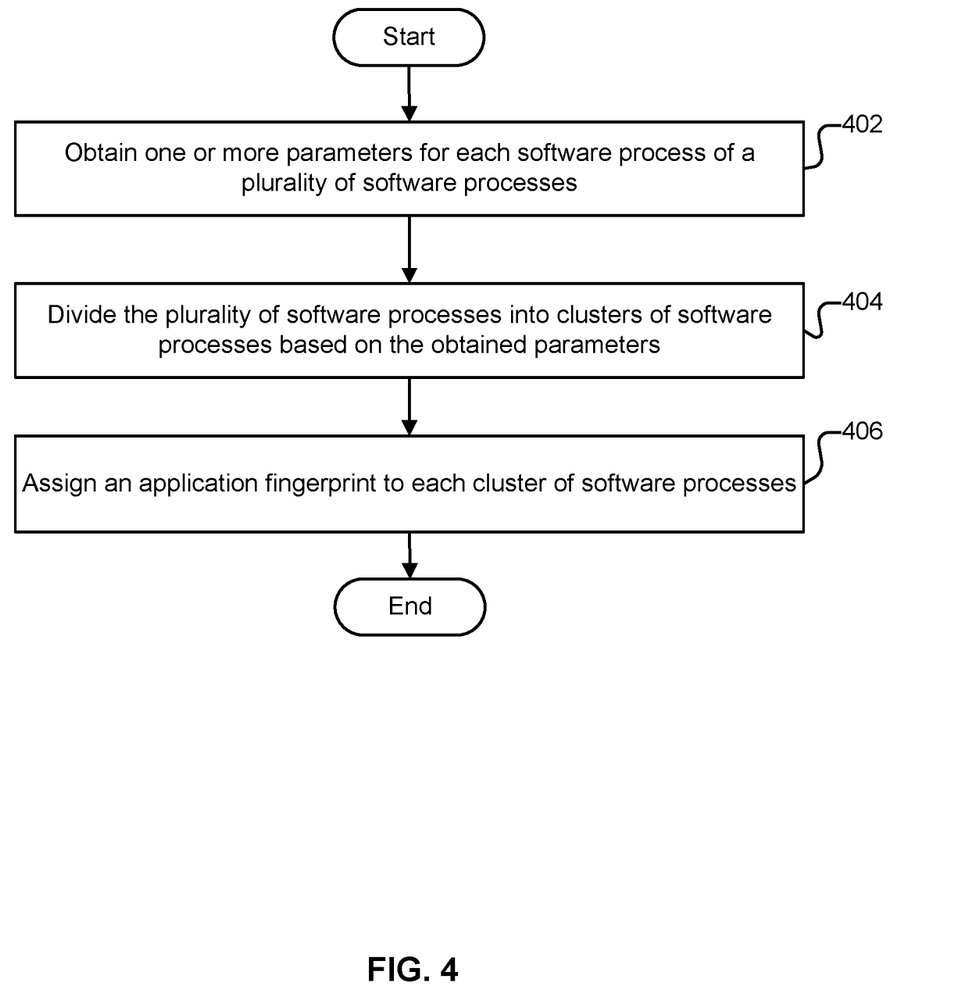
FIG. 4 is a flow chart illustrating an embodiment of a process for determining application fingerprints.

FIG. 4 is a flow chart illustrating an embodiment of a process for determining application fingerprints. In some embodiments, the process of FIG. 4 is performed by IT management server 114 of FIG. 1. In some embodiments, at least a portion of the process of FIG. 4 is performed in 304 of FIG. 3. In various embodiments, the application fingerprints are determined for an alert of interest that is to be remediated. In some scenarios, the application fingerprints for the alert of interest have not already been generated and determining the application fingerprints includes generating them. For example, the alert of interest may have been recently generated and application fingerprints associated with the alert of interest are to be generated and stored in an alert database. In some scenarios, the applications fingerprints have already been generated and determining the application fingerprints involves retrieving application fingerprints from an alert database. The following steps illustrate an example of how application fingerprints are generated.

At 402, one or more parameters for each software process of a plurality of software processes are obtained. As used herein, parameters refer to descriptive information associated with software processes that can be analyzed for software clustering purposes. Examples of parameters that can be used to cluster software processes include: process command lines, process names, process paths, command line parameters, listening ports, and other properties associated with software processes. Process command lines are text utilized to start processes. Process paths specify locations (e.g., a directory in a file system) in which files that start processes are located. A process command line can include a process name and a process path. Command line parameters are input parameters (also known as arguments) that follow a command line and configure/affect how a process initializes and/or executes. A listening port (also referred to simply as a port) is a logical construct that can identify a process (e.g., an address that identifies which process should receive which data transmitted over a network). In some embodiments, a software agent installed on a server (e.g., agent 106 or 110 of FIG. 1) collects the parameters that are utilized to cluster software processes executing on the server. In many scenarios, a variety of parameters are obtained instead of relying on just process names because process names are oftentimes non-specific. For example, many processes have "java" as the process name.

At 404, the plurality of software processes is divided into clusters of software processes based on the obtained parameters. The obtained parameters for each process comprise a unique process signature. In various embodiments, applications can be identified by clustering processes according to their unique process signatures. In various embodiments, the software processes are clustered using a data clustering algorithm. In some embodiments, density-based spatial clustering of applications with noise (DBSCAN) is utilized. Given a set of points in a space, DBSCAN locates points that are close according to a distance metric. The points in the space represent software processes (e.g., points corresponding to feature vectors associated with the obtained parameters). Feature vectors can be regarded as sequences of parameters, wherein the sequences of parameters uniquely identify different software processes. In some embodiments, a Levenshtein distance is utilized to measure the distance between two software processes. Levenshtein distance is also referred to as an edit distance (e.g., edits required to convert one sequence into another). Other clustering approaches that can be used include K-means clustering, mean-shift clustering, expectation-minimization clustering using gaussian mixture models, agglomerative hierarchical clustering, and various other approaches known in the art.

In some embodiments, a trained machine learning model performs the clustering. The machine learning model can be utilized to determine similarity between processes. Examples of machine learning models that can be utilized to perform clustering tasks include word vector representations, window-based neural networks, recurrent neural networks, long-short-term-memory models, recursive neural networks, and convolutional neural networks. Prior to utilizing the machine learning model, the machine learning model is trained on a collection of example software processes with known relatedness (e.g., known distance between the processes). The training occurs before similarity of processes are determined using the machine learning model in inference mode. Processes that are related (e.g., within a specified distance of each other according to a distance metric) are clustered together.

At 406, an application fingerprint is assigned to each cluster of software processes. In some embodiments, an application fingerprint is represented as a color. Stated alternatively, a specified color corresponds to a specified application signature. Thus, each server that is executing a set of applications can be represented by a set (e.g., a vector) of colors. The colors can also be converted to numerical values (e.g., scalar or vector values). Stated alternatively, regardless of how application fingerprints are represented, application fingerprints are signatures that identify applications.

Figure 5:
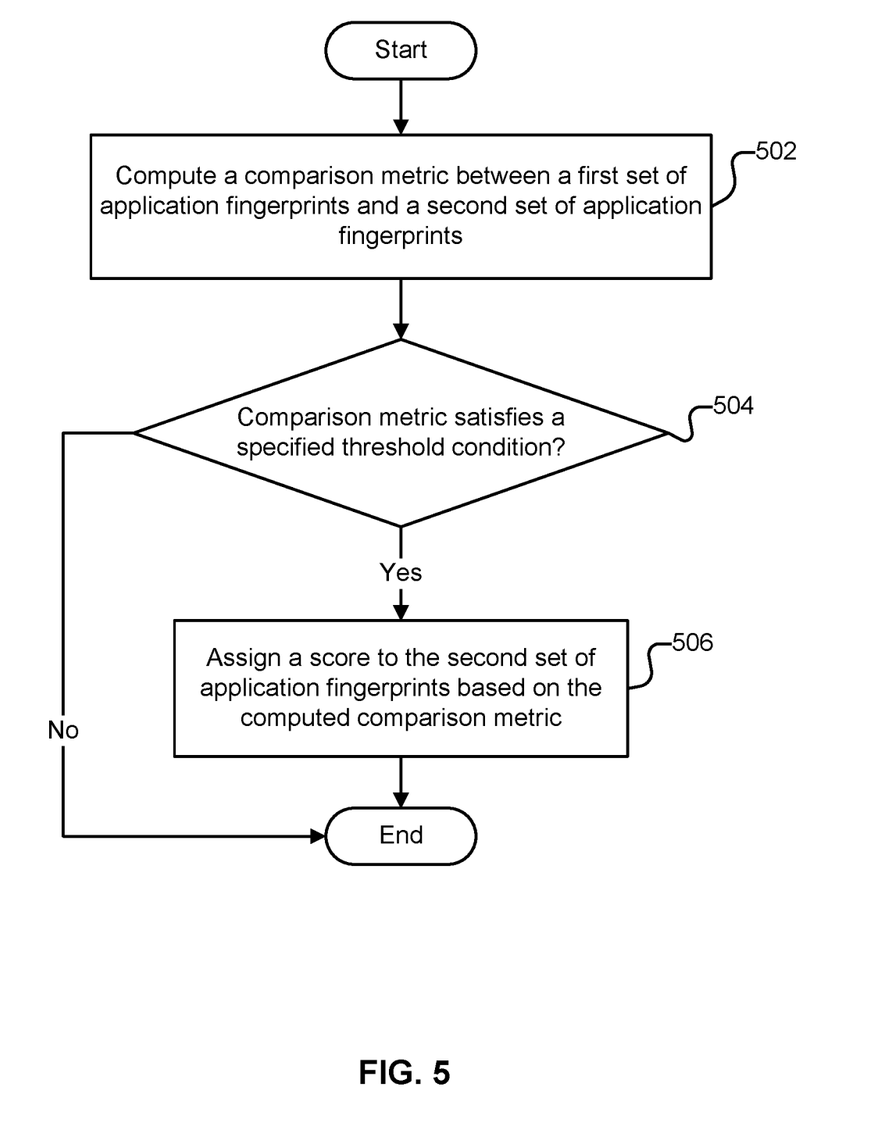
FIG. 5 is a flow chart illustrating an embodiment of a process for comparing application fingerprints.

FIG. 5 is a flow chart illustrating an embodiment of a process for comparing application fingerprints. In some embodiments, the process of FIG. 5 is performed by IT management server 114 of FIG. 1. In some embodiments, at least a portion of the process of FIG. 5 is performed in 306 of FIG. 3.

At 502, a comparison metric is computed between a first set of application fingerprints and a second set of application fingerprints. In some embodiments, the first set of application fingerprints is associated with a new alert to be remediated (e.g., the new alert of FIG. 3). In some embodiments, the second set of application fingerprints is associated with a previous alert that was generated before the new alert. The purpose of computing the comparison metric is to determine how similar the first set of application fingerprints is to the second set of application fingerprints and thus, by association, how similar the new alert is to the previous alert. In various embodiments, the comparison metric is computed for a plurality of previous alerts. Previous alerts that have a specified degree of similarity to the new alert are identified as matching previous alerts. Matching previous alerts are associated with remediation actions that are more likely to be successful in remediating the new alert. In some embodiments, application fingerprints are generated according to the process of FIG. 4. In some embodiments, the application fingerprints are stored in alert database 118 of FIG. 1.

In some embodiments, each set of application fingerprints is represented by a set (e.g., a vector) of numerical values. In some embodiments, each set of application fingerprints can be represented graphically as a group of colors (e.g., a wheel of colors), wherein each application signature corresponds to a color. A distance can be computed between sets of application fingerprints because the application fingerprints can be represented using numerical values. In some embodiments, the comparison metric includes a distance. For example, each set of application fingerprints can be represented as a vector and thus a point in a vector space. The distance between the first set of application fingerprints and the second set of application fingerprints can be calculated as a Euclidean distance (e.g., a straight-line distance between two points). In some embodiments, the comparison metric includes an overlap count (e.g., by counting a number of application fingerprints matched between the first set of application fingerprints and the second set of application fingerprints). The overlap between sets of application fingerprints can be represented as a percentage of overlap. In some embodiments, the comparison metric combines multiple computations with respect to the sets of application fingerprints (e.g., both a distance computation and an overlap computation). For example, the multiple computations can be combined as a weighted average.

In some embodiments, a trained machine learning model compares application fingerprints. The machine learning model can be utilized to determine similarity between sets of application fingerprints. Examples of machine learning models that can be utilized to perform comparison tasks include word vector representations, window-based neural networks, recurrent neural networks, long-short-term-memory models, recursive neural networks, and convolutional neural networks. Prior to utilizing the machine learning model, the machine learning model is trained on a collection of example sets of application fingerprints with known relatedness (e.g., known distance and/or overlap between the sets of application fingerprints). The training occurs before similarity of sets of application fingerprints are determined using the machine learning model in inference mode.

At 504, it is determined whether the comparison metric satisfies a specified threshold condition. For example, in some embodiments, it is determined whether a distance (e.g., a Euclidean distance) is less than a specified threshold distance, an overlap percentage is greater than a threshold number, or a combination of distance and overlap satisfies a specified threshold. If at 504 it is determined that the specified threshold condition is not satisfied, the first set of application fingerprints and the second set of application fingerprints are determined to not be similar enough that the alert associated with the second set of application fingerprints is a matching alert for the new alert to be remediated. If at 504 it is determined that the specified threshold condition is satisfied, at 506, a score is assigned to the second set of application fingerprints based on the computed comparison metric. In some embodiments, the score is the comparison metric (e.g., a distance, overlap percentage, or combination thereof). Previous alerts can be sorted and presented to a user (e.g., an IT administrator) according to their corresponding assigned scores. For example, alerts can be presented in order of similarity to the new alert (e.g., as represented by scores associated with distance and/or overlap).

In various embodiments, similarities between different hosts (e.g., servers) are determined according to the applications they are executing and scores for similarity comparisons are generated. In so doing, it is possible to narrow down a considerable number of alerts to a few. In some embodiments, similar groups of alerts are clustered and stored in alert database 118 of FIG. 1. Clustering similar alerts allows for similar alerts to be retrieved quickly. For example, if it is determined that the new alert is similar to one alert in a cluster of similar alerts, all the alerts in the cluster of alerts can be presumed to be similar to the new alert and presented to the user without comparing the new alert with all the alerts in the cluster of similar alerts. In some embodiments, sets of application fingerprints (and thus the servers and IT alerts they represent) are clustered using a data clustering algorithm. Examples of data clustering algorithms include DBSCAN, K-means clustering, mean-shift clustering, expectation-minimization clustering using gaussian mixture models, agglomerative hierarchical clustering, and various other approaches known in the art. Given a set of points in a space, the data clustering algorithm locates points that are close according to a distance metric (e.g., Euclidean distance). In some embodiments, the points in the space represent IT alerts (e.g., points corresponding to application fingerprint vectors associated with servers associated with IT alerts).

In various embodiments, IT alerts are compared by comparing servers based on server signatures (e.g., application fingerprints). In some embodiments, common application fingerprints are excluded when performing comparisons (e.g., by excluding application fingerprints of software agents that are running on all or substantially all servers). This can lead to comparisons with greater specificity.

Figure 6:
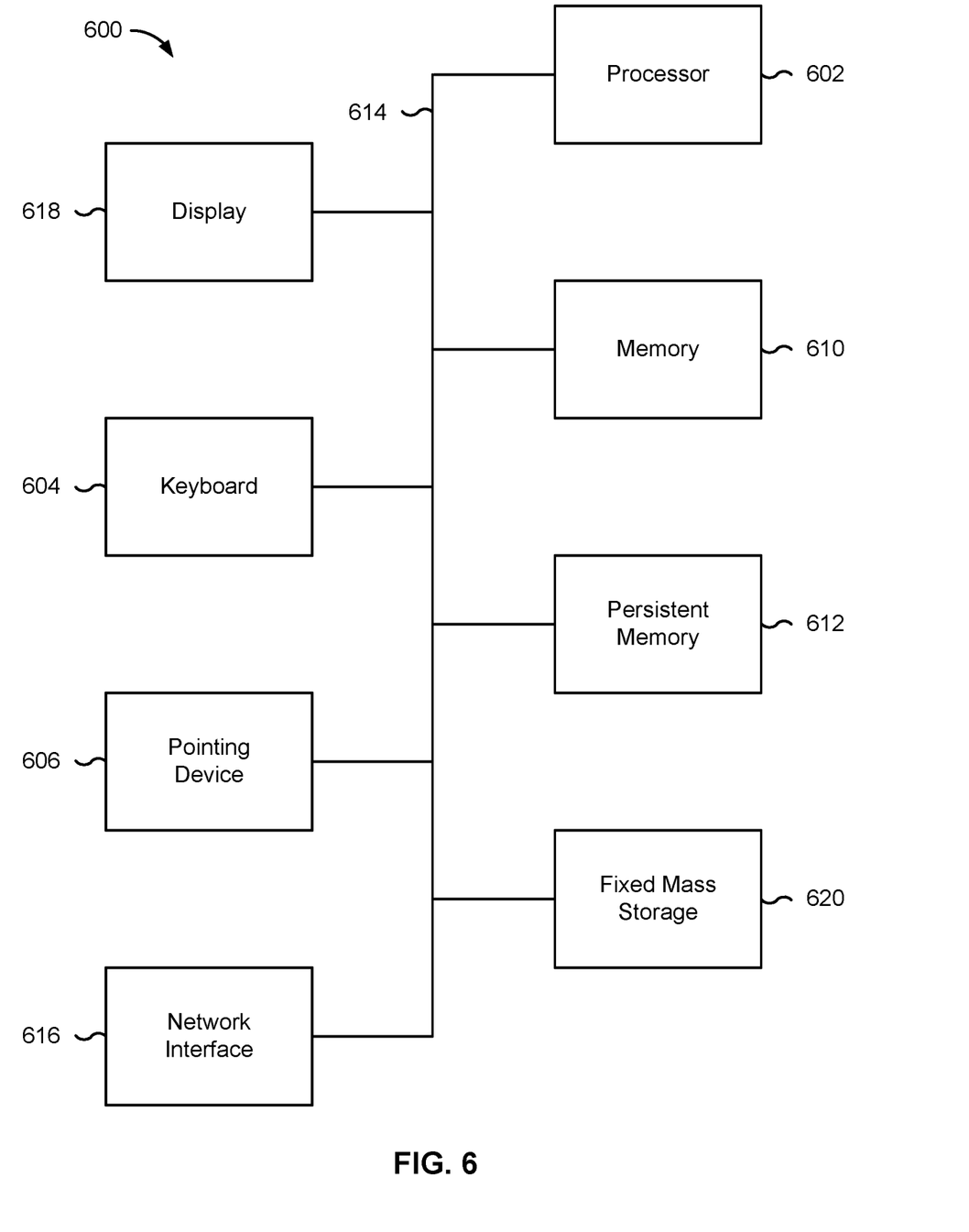
FIG. 6 is a functional diagram illustrating a programmed computer system.

FIG. 6 is a functional diagram illustrating a programmed computer system. In some embodiments, the programmed computer system is client 102 of FIG. 1. In some embodiments, the programmed computer system is a server in system 100 of FIG. 1.

In the example shown, computer system 600 includes various subsystems as described below. Computer system 600 includes at least one microprocessor subsystem (also referred to as a processor or a central processing unit (CPU)) 602. For example, processor 602 can be implemented by a single-chip processor or by multiple processors. In some embodiments, processor 602 is a general-purpose digital processor that controls the operation of computer system 600. Using instructions retrieved from memory 610, processor 602 controls the reception and manipulation of input data, and the output and display of data on output devices (e.g., display 618).

Processor 602 is coupled bi-directionally with memory 610, which can include a first primary storage, typically a random-access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also, as is well known in the art, primary storage typically includes basic operating instructions, program code, data, and objects used by processor 602 to perform its functions (e.g., programmed instructions). For example, memory 610 can include any suitable computer-readable storage media, described below, depending on whether, for example, data access needs to be bi-directional or uni-directional. For example, processor 602 can also directly and very rapidly retrieve and store frequently needed data in a cache memory (not shown).

Persistent memory 612 (e.g., a removable mass storage device) provides additional data storage capacity for computer system 600, and is coupled either bi-directionally (read/write) or uni-directionally (read only) to processor 602. For example, persistent memory 612 can also include computer-readable media such as magnetic tape, flash memory, PC-CARDS, portable mass storage devices, holographic storage devices, and other storage devices.

A fixed mass storage 620 can also, for example, provide additional data storage capacity. The most common example of fixed mass storage 620 is a hard disk drive. Persistent memory 612 and fixed mass storage 620 generally store additional programming instructions, data, and the like that typically are not in active use by processor 602. It will be appreciated that the information retained within persistent memory 612 and fixed mass storages 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, pointing device 606 can be a mouse, stylus, track ball, or tablet, and is useful for interacting with a graphical user interface.

Network interface 616 allows processor 602 to be coupled to another computer, computer network, or telecommunications network using a network connection as shown. For example, through network interface 616, processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect computer system 600 to an external network and transfer data according to standard protocols. Processes can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow processor 602 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a new alert associated with a computer information technology item;
evaluating the new alert, including by determining a plurality of application fingerprints of applications executing on a server associated with the new alert, wherein determining the plurality of application fingerprints includes:
determining a group of software processes executing on the server;
automatically dividing the determined group of software processes into distinct subgroups of software processes; and
assigning a specific application fingerprint to each subgroup of the distinct subgroups of software processes;
identifying matching previous alerts similar to the new alert, including by comparing the application fingerprints of the server associated with the new alert with corresponding application fingerprints of servers associated with previous alerts; and
sorting the matching previous alerts based at least in part on the comparison of the application fingerprints.

2. The method of claim 1, wherein the computer information technology item is associated with one or more of the following: an unresponsive software process, an unresponsive software application, missing or inconsistent computer files, a software runtime error, a software failure to execute, or a software failure to terminate.

3. The method of claim 1, wherein the computer information technology item is associated with one or more of the following: a power supply failure, a storage device failure, overheating, a connection cable failure, or a network connectivity failure.

4. The method of claim 1, further comprising presenting the new alert to an information technology administrator through a user interface of a programmed computer system.

5. The method of claim 1, wherein the new alert is received from an alert management information technology component that generated the new alert based at least in part on information collected by an event monitoring software agent.

6. The method of claim 1, wherein each application fingerprint of the application fingerprints of the server associated with the new alert corresponds to an application executing on the server associated with the new alert when an issue of the computer information technology item occurred.

7. The method of claim 1, wherein automatically dividing the determined group of software processes into distinct subgroups of software processes includes determining subgroups for the determined group of software processes based on one or more specified software process parameters.

8. The method of claim 7, wherein the one or more specified software parameters includes at least one of the following: a command that starts software process execution, a parameter that specifies software process configuration upon execution, a software process name, a software process file location path, or a software process identification port.

9. The method of claim 7, wherein determining subgroups for the determined group of software processes includes utilizing data clustering.

10. The method of claim 9, wherein the data clustering is associated with density-based spatial clustering of applications with noise.

11. The method of claim 1, further comprising presenting the matching previous alerts to an information technology administrator through a user interface of a programmed computer system.

12. The method of claim 1, wherein comparing the application fingerprints of the server associated with the new alert with the corresponding application fingerprints of the servers associated with the previous alerts is based at least in part on computing vector distances between a vector associated with the application fingerprints of the server associated with the new alert and corresponding vectors associated with the corresponding application fingerprints of the servers associated with the previous alerts.

13. The method of claim 1, wherein comparing the application fingerprints of the server associated with the new alert with the corresponding application fingerprints of the servers associated with the previous alerts is based at least in part on computing fingerprint overlaps between the application fingerprints of the server associated with the new alert and the corresponding application fingerprints of the servers associated with the previous alerts.

14. The method of claim 1, further comprising presenting one or more remediation actions associated with a selected one of the matching previous alerts to a user through a user interface of a programmed computer system.

15. The method of claim 1, wherein identifying matching previous alerts similar to the new alert further includes comparing an alert description text associated with the new alert with corresponding alert description texts of the previous alerts.

16. The method of claim 15, wherein comparing the alert description text associated with the new alert with the corresponding alert description texts of the previous alerts includes matching alert description text keywords, matching alert description text meanings determined by a natural language understanding model, or a combination of matching alert description text keywords and alert description text meanings.

17. The method of claim 1, further comprising retrieving the previous alerts from an alert data store.

18. The method of claim 1, further comprising automatically initiating a performance of a selected one of one or more remediation actions associated with an alert of the matching previous alerts.

19. A system, comprising:
one or more processors configured to:
receive a new alert associated with a computer information technology item;
evaluate the new alert, including by determining a plurality of application fingerprints of applications executing on a server associated with the new alert, wherein determining the plurality of application fingerprints includes:
- determining a group of software processes executing on the server;
- automatically dividing the determined group of software processes into distinct subgroups of software processes; and
- assigning a specific application fingerprint to each subgroup of the distinct subgroups of software processes;

identify matching previous alerts similar to the new alert, including by comparing the application fingerprints of the server associated with the new alert with corresponding application fingerprints of servers associated with previous alerts; and sort the matching previous alerts based at least in part on the comparison of the application fingerprints; and a memory coupled to at least one of the one or more processors and configured to provide at least one of the one or more processors with instructions.

20. A computer program product embodied in a non-transitory computer readable medium and comprising computer instructions for:

receiving a new alert associated with a computer information technology item;

evaluating the new alert, including by determining a plurality of application fingerprints of applications executing on a server associated with the new alert, wherein determining the plurality of application fingerprints includes:
- determining a group of software processes executing on the server;
- automatically dividing the determined group of software processes into distinct subgroups of software processes; and
- assigning a specific application fingerprint to each subgroup of the distinct subgroups of software processes;

identifying matching previous alerts similar to the new alert, including by comparing the application fingerprints of the server associated with the new alert with corresponding application fingerprints of servers associated with previous alerts; and sorting the matching previous alerts based at least in part on the comparison of the application fingerprints.

* * * * *